United States Patent
Yoshii

(10) Patent No.: US 7,321,407 B2
(45) Date of Patent: Jan. 22, 2008

(54) REFLECTOR AND LIQUID CRYSTAL DISPLAY

(75) Inventor: Katsumasa Yoshii, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 27 days.

(21) Appl. No.: 10/677,875

(22) Filed: Oct. 2, 2003

(65) Prior Publication Data

US 2004/0070710 A1    Apr. 15, 2004

(30) Foreign Application Priority Data

Oct. 11, 2002    (JP) ............... 2002-298596

(51) Int. Cl.
*G02F 1/1335* (2006.01)
(52) U.S. Cl. ............................ 349/113
(58) Field of Classification Search ........ 349/113; 359/599
See application file for complete search history.

(56) References Cited

U.S. PATENT DOCUMENTS

| | | | | |
|---|---|---|---|---|
| 3,905,682 A | * | 9/1975 | Meyerhofer | 349/113 |
| 5,841,496 A | * | 11/1998 | Itoh et al. | 349/113 |
| 6,141,073 A | * | 10/2000 | Sasaki et al. | 349/122 |
| 6,747,719 B2 | * | 6/2004 | Higashi | 349/113 |
| 6,805,925 B2 | * | 10/2004 | Uchida et al. | 428/1.3 |
| 7,012,660 B1 | * | 3/2006 | Umemoto | 349/65 |
| 2002/0030774 A1 | | 3/2002 | Yoshii et al. | |
| 2004/0228141 A1 | * | 11/2004 | Hay et al. | 362/555 |

* cited by examiner

*Primary Examiner*—Dung T. Nguyen
(74) *Attorney, Agent, or Firm*—Brinks Hofer Gilson & Lione

(57) ABSTRACT

A reflector includes a reflection substrate and an optical diffusion layer deposited on the reflection substrate, which is provided with a plurality of reflection inclined planes continuously formed on a surface thereof with a stripe geometry in plan view and a surface of each refection inclined plane is an irregular irregular surface, and the optical diffusion layer is made of a matrix of a transparent resin or a transparent adhesive having fine particles dispersed therein so as to flatten the reflection substrate.

46 Claims, 10 Drawing Sheets

REFLECTOR AND LIQUID CRYSTAL DISPLAY

This application claims the benefit of priority to Japanese Patent Application No. 2002-298596, herein incorporated by reference.

BACKGROUND OF THE INVENTION

1. Field of the Invention

The present invention relates to a reflection liquid crystal display, and in particular relates to a liquid crystal display in that visibility is improved by imparting optical diffusion to a liquid crystal cell.

2. Description of the Related Art

The reflection liquid crystal display is a liquid crystal display using only ambient light such as sunlight and illumination as the illumination light, and it is widely used in portable information terminals and the like requiring low electric consumption. A semi-permeable liquid crystal display is another example in that under a circumstance where ambient light cannot be sufficiently obtained, it is operated in a transparent mode by turning on a backlight while when ambient light can be sufficiently obtained, it is operated in a reflection mode without turning on the backlight, so that this display is widely used in portable electronic instruments such as mobile phones and notebook personal computers.

The reflection liquid crystal display is required to have bright display performance. In order to achieve this display performance, it is important to control diffusion performance to incident light from outside which is then reflected by the inside of the reflection liquid crystal display and emitted again outside. Therefore, in the reflection liquid crystal display, in order to impart the performance in that incident light from every angular direction can be reflected in a display direction (to an observer), a system imparting diffusion performance to a reflection plate provided inside or outside the liquid crystal display or a front diffusion system in that a diffusion layer is formed inside the liquid crystal display so that light is scattered during passing through the diffusion layer is incorporated in the reflection liquid crystal display.

FIG. 9 is a side sectional view of an example of a conventional reflection liquid crystal display having a reflection plate with diffusion performance disposed in a liquid crystal panel. This reflection liquid crystal display includes a light-transmissive opposing substrate 101, a liquid crystal layer 110, and a light-reflective element substrate 102 sequentially arranged in a light-incidence direction, and the element substrate 102 is provided with a reflection diffusion band reflecting and scattering light Q passed through the opposing substrate 101. The diffusion band is made of a reflection plate 130 having a high-reflectance metallic film 122 with corrugated portions 122a formed on the surface and an insulating layer 128 as an under layer. A region per one pixel of the reflection plate 130 is divided into two regions of a region A with strongly directional reflection characteristics and a region B with strongly diffusive reflection characteristics, and each region has a irregular surface formed with an average inclination angle different from each other.

In addition, this reflection liquid crystal display can also be used as the semi-permeable type by reducing the thickness of the high-reflectance metallic film 122 or by forming micro-pores for transmission.

FIG. 10 is a drawing showing reflection characteristics of the reflection plate provided in this reflection liquid crystal display. In the drawing, a curve A is a reflection characteristic profile in the region A of FIG. 9; a curve B is a reflection characteristic profile in the region B of FIG. 9; and a curve C is a reflection characteristic profile in the entire one pixel. The reflection characteristics are dependency of an emitting angle of reflection light measured by fixing a white light source in a normal direction relative to the surface of the reflection plate and rotating a detector for measuring reflection light intensity.

The curves (A) and (B) are profiles with Gaussian distribution about a regular reflection angle of incidence light as a center. The distribution width of each curve is reflected in reflection characteristics of each of the regions (A) and (B). That is, the half-band width of the profile of the reflection characteristics (B) is larger than that of the reflection characteristics (A).

The curve (C) of the profile showing the final reflection characteristics of one pixel exhibits Gaussian distribution about a regular reflection angle of incidence light as a center in the same way as in the curves (A) and (B), and the half-band width of this profile shows an average of the entire one pixel.

In the case where a liquid crystal display is assembled in a device used by inclining a display surface like mobile phones and notebook computers, the device is generally viewed at an angle close to a normal direction H relative to the display surface, as shown in FIG. 11. In general, an angle $\theta_1$ defined by a principal visual direction α when an observer (user) views the display surface (screen) and the normal direction H is in a range between 0° and 20°.

FIG. 11 is an explanatory view of a service condition of a mobile phone having a liquid crystal display 100 provided in a body 105. Referring to FIG. 11, numeral H denotes a normal line relative to the display 100; numeral Q denotes incident light; and numeral $\omega_0$ denotes an incident angle (30°, for example). Also, $R_1$ represents reflection light (regular reflection) when the incident angle $\omega_0$ equals to a reflection angle ω; $R_2$ represents reflection light when the reflection angle ω is smaller than the incident angle $\omega_0$; and $R_3$ represents reflection light when the reflection angle ω is larger than the incident angle $\omega_0$.

As is understood from the drawing, an observing point Ob of the observer is generally directed to the reflection light $R_2$ close to the normal direction H. More specifically, the observing points Ob are concentrated within a range of 10° from the normal direction H. Whereas the reflection light rays $R_1$ and $R_3$ are upward directed to the display surface from the below so that they are difficult to see. Therefore, in view of observer's conveniences, it is required that while a wide angle of visibility is maintained, the reflection light $R_2$, in which the reflection angle is smaller than the regular reflection angle, is increased.

However, in the conventional reflection liquid crystal display shown in FIG. 9, the reflecting range of incident light is increased. That is, although the optical diffusion is achieved, most part of incident light is reflected in the regular reflection direction and in the direction $R_1$ close to the regular reflection (exhibiting reflection characteristics with the Gaussian distribution), so that although the display viewed in the regular reflection direction and directions close to the direction is bright, the display viewed in the other directions is dark.

Therefore, when the display surface of a mobile phone or the like having the conventional reflection liquid crystal display provided in the display unit is viewed, since the observing points of an observer are generally concentrated in a direction close to the normal direction H as mentioned above, the display is dark and for viewing the bright display, the display must be viewed in the regular reflection direction R1 and its close directions, so that the display surface must be upward viewed from the below, resulting in difficulty in viewing the display, as described above.

Also, in the conventional reflection liquid crystal display shown in FIG. 9, the reflection plate 130 having a corrugated reflection surface is used; however, although fine corrugated reflection surface improves the controllability of reflection light, the spectrum is prone to be produced under strong sunlight so that there has been a problem that a rainbow pattern is viewed on the display screen, damaging visibility.

When a front light type prism light-guide plate is arranged in the display adjacent to an observer as a light source, the spectrum is prone to be produced so that there has also been a problem that a rainbow pattern is viewed on the display screen, damaging visibility.

SUMMARY OF THE INVENTION

The present invention has been made in order to solve the above-mentioned problems, and it is an object thereof to provide a liquid crystal display having reflection characteristics that increase the brightness of reflection light in a wide angular range and also being capable of approximating the reflection angle of the reflection light to a direction close to the visual axis of an observer, and moreover of preventing rainbows from being produced on the display screen.

In order to achieve the above-mentioned object, the present invention incorporates the following configurations.

A reflector according to the present invention comprises a reflection substrate; and an optical diffusion layer deposited on the reflection substrate, wherein the reflection substrate is provided with a plurality of reflection inclined planes continuously formed on a surface thereof with a stripe geometry in plan view and a surface of each refection inclined plane is an irregular irregular surface, and wherein the optical diffusion layer is made of a matrix of a transparent resin or a transparent adhesive having fine particles dispersed therein so as to flatten the reflection substrate.

According to such a reflector, the optical diffusion layer made of a matrix having fine particles dispersed therein is provided on the reflection substrate, and since this optical diffusion layer is difficult to produce a spectrum in comparison with a conventional reflector having a finely corrugated reflection surface, a rainbow pattern cannot be observed on the display screen.

Also, the reflection substrate is provided with a plurality of reflection inclined planes continuously formed on a surface thereof with a stripe geometry in plan view, so that the incident light in the reflector can be controlled and reflected in a specific direction.

Furthermore, since the refection inclined plane is a irregular surface, incident light can be scattered during reflection, enabling a reflection angular range to be increased.

In a reflector according to the present invention, preferably, a haze of the optical diffusion layer is between 15% and 30%.

The haze (haze value) is an index value representing the degree of optical diffusion as will be described later. If the optical diffusion of the optical diffusion layer is too small, the effect eliminating rainbows on the display screen is insufficient while if the optical diffusion is too large, display characteristics of the display screen are remarkably deteriorated. When the haze of the optical diffusion layer is between 15% and 30%, the rainbows can be prevented from being produced on the display screen while the display characteristics of the liquid crystal display are restricted from being deteriorated.

In a reflector according to the present invention, preferably, an inclined angle θ of the refection inclined plane with respect to a surface of the reflection substrate is between 0° and 30°.

The fine particles used in a reflector according to the present invention may have a particle diameter between 1 μm and 20 μm, and more preferably between 3 μm and 15 μm.

As specific examples, the fine particles may be exemplified by those made of silica, a styrene-butadiene copolymer, divinylbenzene, a urethane resin, a silicone resin, an epoxy resin, and polyethylene.

Also, as specific examples, the matrix may be exemplified by an acrylic resin and a urethane resin.

An additive rate of the fine particles to the matrix preferably is between 0.1 mass % and 10 mass %.

In a reflector according to the present invention, a pitch L of the reflection inclined plane of the reflection substrate is preferable to have a constant value in a range between 5 μm and 80 μm. Wherein the pitch L of the reflection inclined plane represents a distance from the base end of the reflection inclined plane to the other end parallel to the direction of the substrate surface.

Also, the concave and convex portions may preferably have a depth or a height between 0.3 μm and 3 μm irregularly.

Furthermore, in a reflector according to the present invention, the adjacent concave portions or the adjacent convex portions may preferably be arranged in an irregular arrangement at a pitch between 1 μm and 30 μm.

Next, a liquid crystal display according to the present invention comprises a liquid crystal cell which comprises substrates opposing each other and a liquid crystal layer sandwiched by the substrates therebetween, one substrate having an electrode and an alignment layer formed on the internal surface in that order from the one substrate while the other substrate having an electrode and an alignment layer formed on the internal surface in that order from the other substrate; a front light arranged adjacently to the external surface of the other substrate; a reflection substrate arranged adjacently to the external surface of the one substrate or between the one substrate and the electrode disposed on the one substrate; and an optical diffusion layer arranged between the front light and the reflection substrate, wherein the reflection substrate is provided with a plurality of reflection inclined planes continuously formed on a surface thereof with a stripe geometry in plan view and a surface of each refection inclined plane is an irregular irregular surface, and wherein the optical diffusion layer is made of a matrix of a transparent resin or a transparent adhesive having fine particles dispersed therein.

According to such a liquid crystal display, the optical diffusion layer made of the matrix having fine particles dispersed therein is arranged between the front light and the reflection substrate, and this optical diffusion layer is difficult to produce a spectrum in comparison with a conventional reflector having a finely corrugated reflection surface, so that a rainbow pattern cannot be observed on the display screen.

Also, the reflection substrate is provided with a plurality of reflection inclined planes continuously formed on a surface thereof with a stripe geometry in plan view, so that the incident light in the reflector can be controlled and reflected in a specific direction. In particular, aligning the reflection direction to the visual axial direction of an observer enables the high brightness display to be achieved.

Furthermore, since the refection inclined plane is a irregular surface, incident light can be scattered during reflection, enabling a reflection angular range and an angle of visibility range to be increased.

In a liquid crystal display according to the present invention, preferably, the optical diffusion layer is arranged between the other substrate and the front light.

According to such a liquid crystal display, the space between the reflection substrate and the optical diffusion layer can be comparatively increased, improving the optical diffusion effect due to the optical diffusion layer.

In a liquid crystal display according to the present invention, preferably, the optical diffusion layer is deposited on the reflection substrate so as to form a reflector, which is arranged between the one substrate and the electrode formed on the internal surface of the one substrate.

According to such a liquid crystal display, the optical diffusion layer is deposited on the reflection substrate so as to form the reflector, and this optical diffusion layer serves as a flattening layer for the reflection substrate, so that the reflector can be arranged inside the liquid crystal cell.

Also, the optical path length can be reduced by arranging the reflection substrate inside the liquid crystal cell, resulting in achieving bright display performances by reducing optical losses.

In a liquid crystal display according to the present invention, preferably, the optical diffusion layer is deposited on the reflection substrate so as to form a reflector, which is arranged adjacently to the external surface of the one substrate.

According to such a liquid crystal display, after the liquid crystal cell is formed, the display can be structured only by bonding the reflector thereto. In this case, the matrix of the optical diffusion layer may be preferably made of a transparent adhesive.

In a liquid crystal display according to the present invention, preferably, a haze of the optical diffusion layer is between 15% and 30%.

If the haze of the optical diffusion layer is between 15% and 30%, the rainbows can be prevented from being produced on the display screen while the display characteristics of the liquid crystal display are restricted from being deteriorated.

In a liquid crystal display according to the present invention, preferably, an inclined angle θ of the refection inclined plane with respect to a surface of the reflection substrate is between 0° and 30°.

The fine particles contained in the optical diffusion layer of the liquid crystal display according to the present invention may preferably have a particle diameter between 1 μm and 20 μm, more preferably between 3 μm and 15 μm.

As specific examples, the fine particles may be exemplified by those made of silica, a styrene-butadiene copolymer, divinylbenzene, a urethane resin, a silicone resin, an epoxy resin, and polyethylene.

Also, as specific examples, the matrix may be exemplified by an acrylic resin and a urethane resin.

An additive rate of the fine particles to the matrix preferably is between 0.1 mass % and 10 mass %.

In a liquid crystal display according to the present invention, a pitch L of the reflection inclined plane of the reflection substrate is preferable to have a constant value in a range between 5 μm and 80 μm.

Also, the concave and convex portions may preferably have a depth or a height between 0.3 μm and 3 μm irregularly.

Furthermore, in a liquid crystal display according to the present invention, the adjacent concave portions or the adjacent convex portions may preferably be arranged in an irregular arrangement at a pitch between 1 μm and 30 μm.

DESCRIPTION OF THE PREFERRED EMBODIMENTS

First Embodiment

Figure 1:
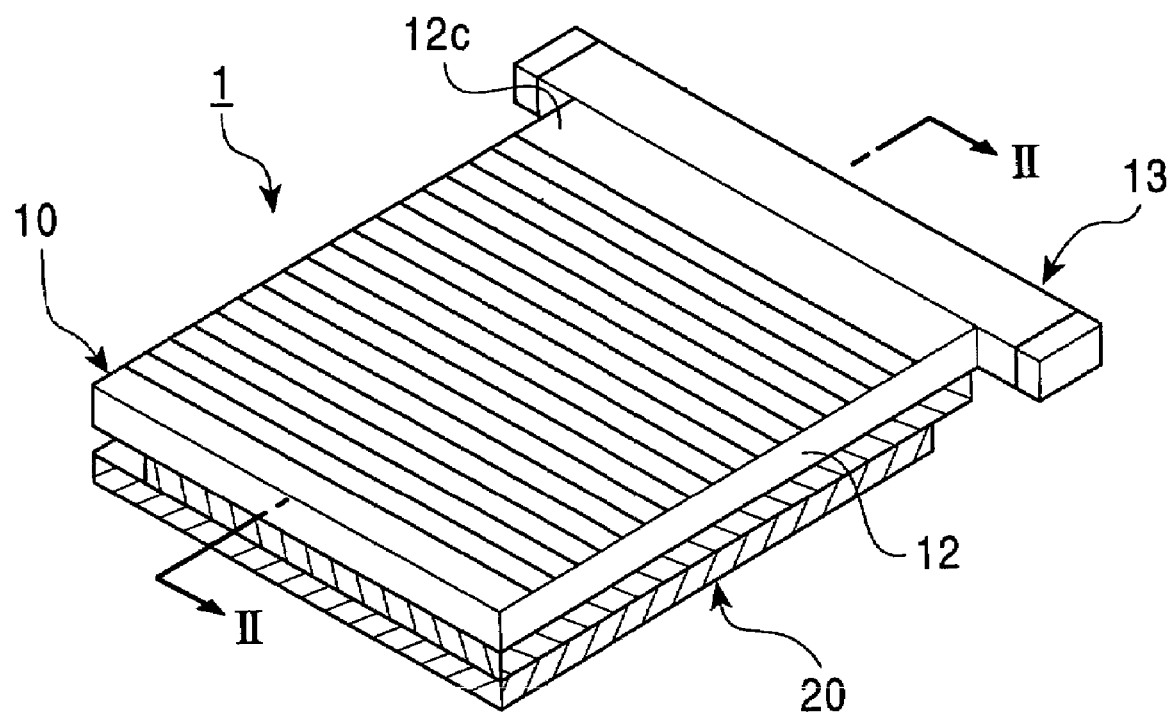
FIG. 1 is a perspective view of a liquid crystal display according to a first embodiment of the present invention.
Figure 2:
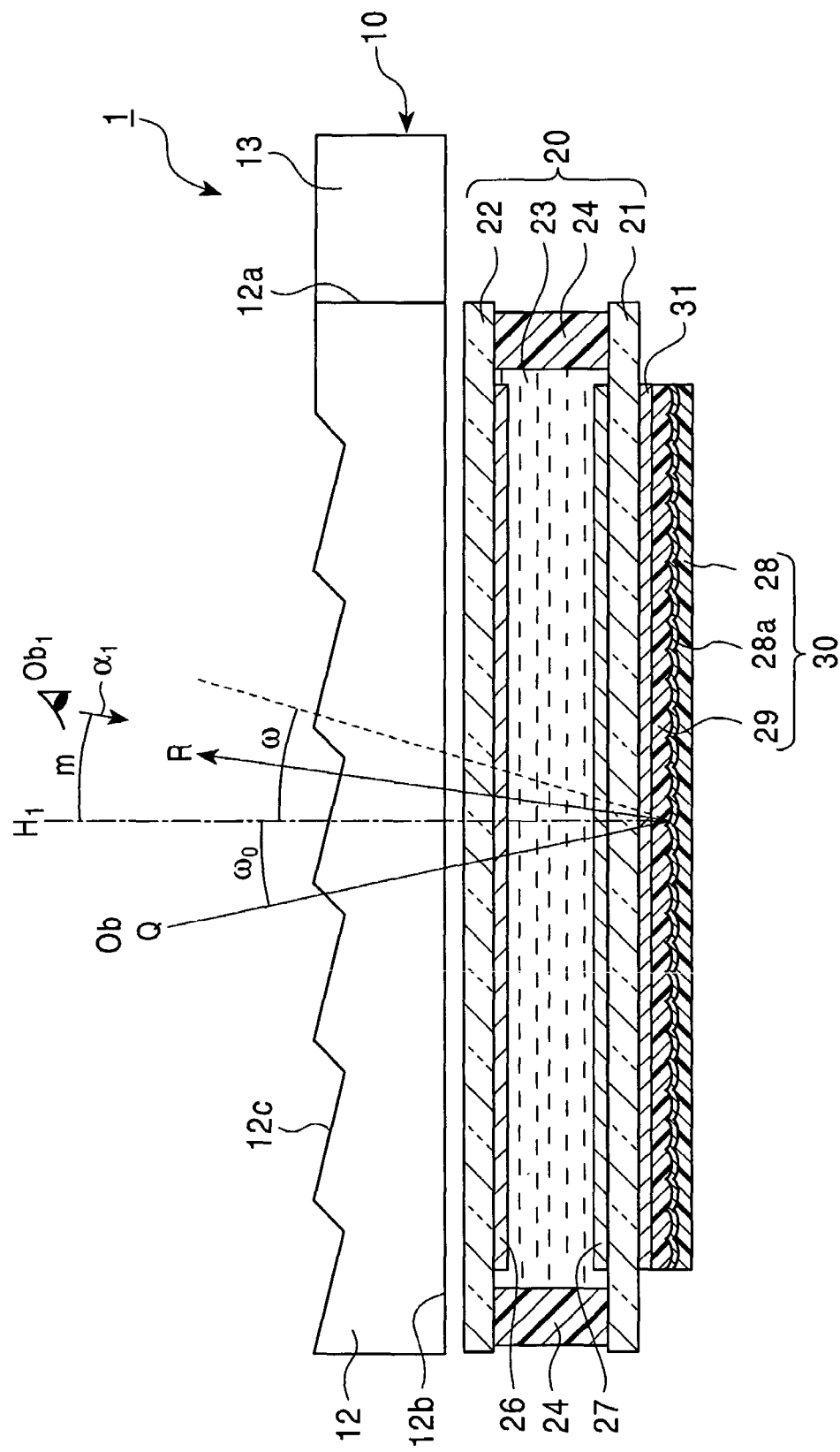
FIG. 2 is a schematic sectional view at the line II-II of FIG. 1.
Figure 3:
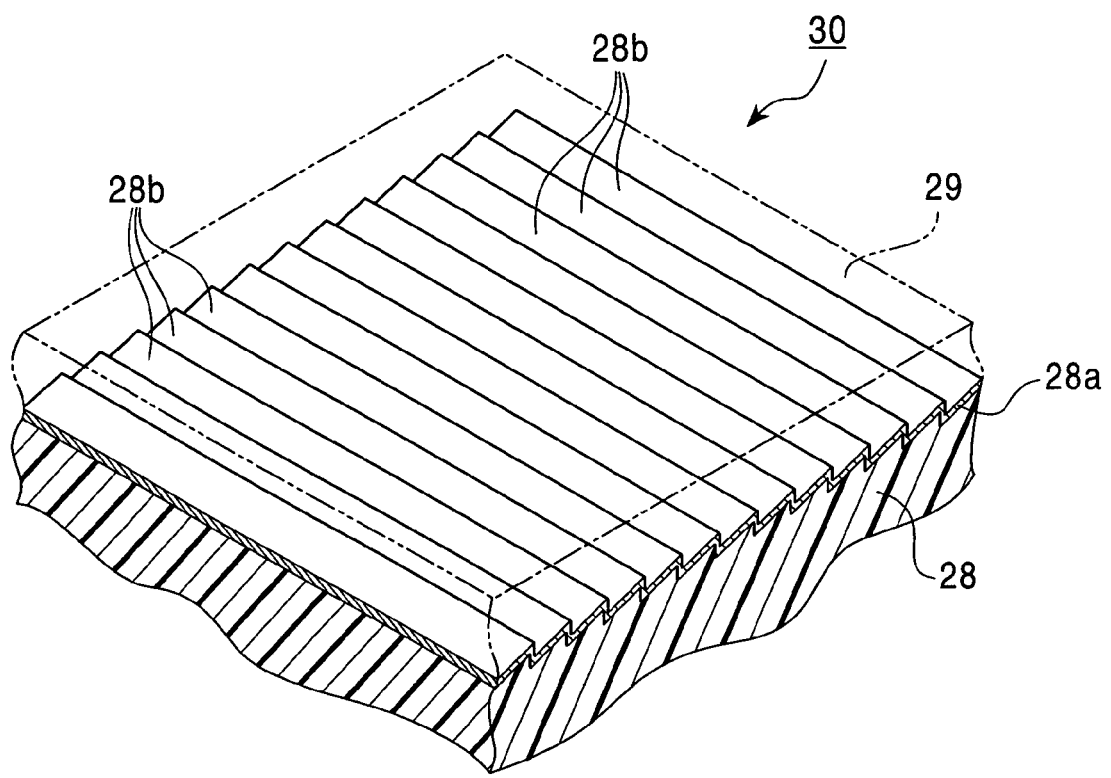
FIG. 3 is a partial perspective view of a reflector used in the liquid crystal display shown in FIG. 1.
Figure 4:
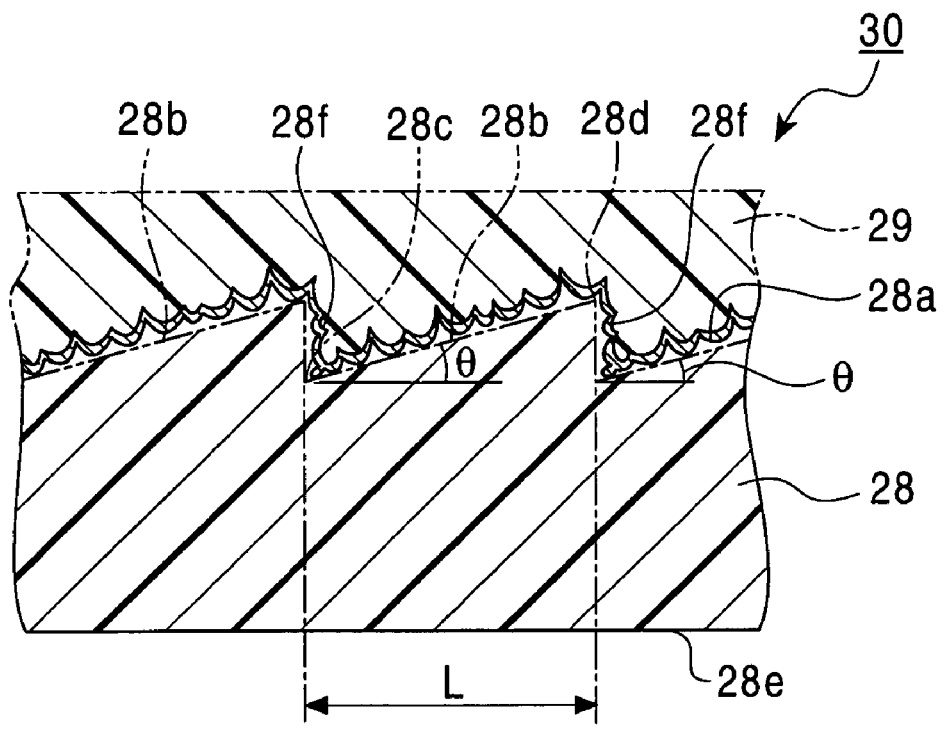
FIG. 4 is a partial sectional view of the reflector shown in FIG. 3.
Figure 5:
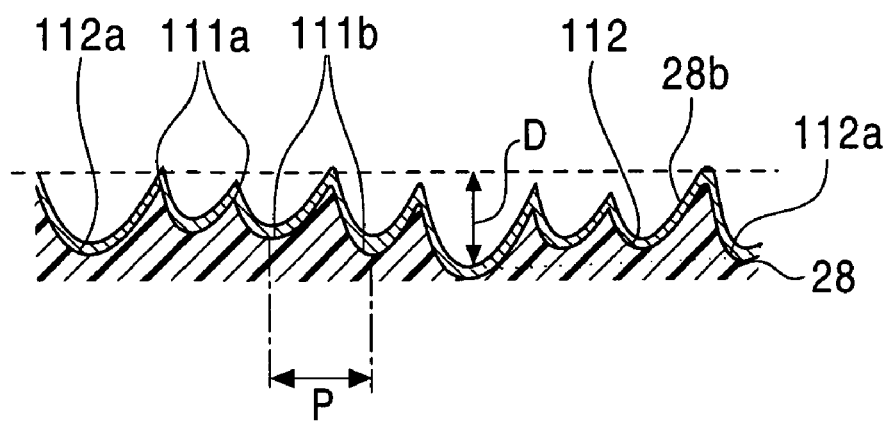
FIG. 5 is an enlarged sectional view showing a sectional curve of a reflection inclined-plane section of the reflector shown in FIG. 3.

A first embodiment of the present invention will be described below with reference to the drawings. FIG. 1 is a perspective view of a liquid crystal display according to the first embodiment; FIG. 2 is a schematic sectional view at the line II-II of FIG. 1; FIG. 3 is a partial perspective view of a reflector used in the liquid crystal display shown in FIG. 1; FIG. 4 is a partial sectional view of the reflector; and FIG. 5 is an enlarged sectional view of a reflection inclined plane.

As shown in FIGS. 1 and 2, a liquid crystal display 1 according to the embodiment is substantially composed of a liquid crystal cell 20, a front light 10 disposed adjacently to an observer of the liquid crystal cell 20, and a reflector 30 according to the present invention externally attached on the surface of the liquid crystal cell 20 opposite to the front light 10.

The liquid crystal cell 20 is substantially composed of a first substrate (one substrate) 21 and a second substrate (the other substrate) 22, which are opposing each other and sandwiching a liquid crystal layer 23 therebetween, and are integrally bonded with a sealing material 24.

The first substrate 21 and the second substrate 22 each are made of transparent substrates such as glass substrates. There are provided display circuits 26 and 27 arranged adjacently to the liquid crystal layer 23 (on internal surfaces of the liquid crystal layer 23), respectively.

The display circuits 26 and 27, although not shown, each include electrode layers made of transparent conductive films for driving the liquid crystal layer 23 and alignment layers for controlling orientation of the liquid crystal layer 23. In the case of color displaying, they may include color filters.

As shown in FIG. 2, the front light 10 is adjacently arranged to the external surface (to an observer) of the second substrate 22 (the other substrate), and although not limited in particular, the front light 10 may use a planar illuminant having translucency and with any shape. According to the embodiment, the front light 10 is composed of a transparent light-guide plate 12 made of an acrylic resin and a light source 13 disposed on a side end-face 12a of the light-guide plate 12 and made of a cold cathode ray tube. The bottom surface of the light-guide plate 12 (surface adjacent to the liquid crystal cell 20) is a smooth light-emitting surface 12b. The surface of the light-guide plate 12 opposite to the light-emitting surface 12b is a prism surface 12c, on which a plurality of wedge-shaped grooves with a stripe geometry are formed at a predetermined pitch for deflecting the direction of a light ray transmitting inside the light-guide plate 12.

As shown in FIG. 2, the reflector 30 is arranged on the external surface of the first substrate (the one substrate) 21 of the liquid crystal cell 20 with a transparent adhesive layer 31 therebetween. The reflector 30, as shown in FIGS. 2 and 3, is composed of a reflection substrate 28 and an optical diffusion layer 29 deposited on the reflection substrate 28. On the surface of the reflection substrate 28, a metallic reflection film 28a is formed, and the optical diffusion layer 29 is deposited in contact with the metallic reflection film 28a.

The reflection substrate 28 is made of a photosensitive resin such as an acrylic resist, and on the reflection substrate 28, as shown in FIGS. 3 and 4, a plurality of reflection inclined planes 28b are continuously formed with a stripe geometry in plan view.

As shown in FIG. 4, each reflection inclined plane 28b is inclined from the base end 28c toward the other end 28d so as to separate from the bottom surface 28e of the reflection substrate 28, and an inclined angle θ thereof with respect to the bottom surface (substrate surface) 28e is a constant angle in a range between 0° and 30°, and it is preferably in a range of 5° to 20°.

Between the two adjacent reflection-inclined planes 28b and 28b, a wall surface 28f is disposed, and by the wall surface 28f, the reflection inclined planes 28b . . . are connected together.

If the inclined angle θ of the reflection inclined plane 28b is less than 0° or more than 30°, it is not preferable because the reflection angle of reflection light cannot approach the visual axial direction of an observer. In particular, as shown in FIG. 2, it is preferable that the inclined angle θ be about ½ of an angle m defined by the normal direction $H_1$ of a display surface 1a and the primary observing angle $α_1$ of an observer in view that the reflection angle of reflection light can be aligned to the visual axis of the observer. Specifically, the above-mentioned angle m is generally between 0° and 20° in practical view, so that it is preferable that the inclined angle θ be about between 0° and 10°.

An inclined angle of the wall surface 28f with respect to the reference surface 28e is a constant angle in a range between 90° and 135°, and a range between 95° and 120° is preferable (in addition, FIGS. 3 and 4 show the case where the inclined angle of the wall surface 28f is 90°).

If the inclined angle of the wall surface 28f is less than 95°, acute angle inclined faces are formed by fluctuation, so that random irregular surfaces cannot be formed on the wall surface 28f in practice, while if the inclined angle is more than 120°, the rate of gentle slopes is increased, resulting in deterioration of reflection characteristics.

Next, a pitch L of the reflection inclined plane 28b is preferable to have a constant value in a range between 5 μm and 80 μm, and the range between 10 μm and 60 μm is more preferable.

Wherein the pitch L of the reflection inclined plane 28b represents a distance from the base end 28c of the reflection inclined plane 28b to the other end 28d parallel to the direction of the substrate surface 28e.

If the pitch L is less than 5 μm, because of the too small pitch, the efficiency in forming the reflection inclined plane 28b is reduced and it is difficult to obtain required reflection characteristics because of the reduced height of the wall surface 28f, while if the pitch L is more than 80 μm, it is difficult to control reflection characteristics by the reflection inclined plane 28b because of the too large pitch.

It is also preferable that the pitch L of the reflection inclined plane 28b have the relationship with the pattern of the prism surface 12c of the light-guide plate 12 in the front light 10, the electrode of the liquid crystal display, and the pattern of the color filter (patterns of R, G, and B and the pattern of the black mask) so as not to produce a moiré effect. If the cycle period direction of the pitch L of the reflection inclined plane 28b is the same that of the above-mentioned patterns of the prism surface, the electrode, and the color filter, an optical interference such as the moiré pattern does not occur.

In the case where fluctuations are produce in the patterns of the prism surface, the electrode, and the color filter, or the cycle period direction of the pitch L of the reflection inclined plane 28b is different from that of the patterns of the prism surface, the electrode, and the color filter, an interference may be optically produced; whereas in the liquid crystal display 1 according to the embodiment, there is provided the optical diffusion layer 29 as will be described later, so that the optical interference is restricted to occur, enabling an excellent visibility to be obtained.

As shown in FIGS. 4 and 5, on each reflection inclined plane 28b, convex portions 111a and concave portions 111b are formed in an irregular arrangement. The concave portion 111b has a depth between 0.3 μm and 3 μm, wherein the depth of the concave portion 111b represents a distance from a surface including the apex located at the longest distance from the bottom surface 28e of the reflection substrate 28 among apexes of the convex portions 111a.

In the reflection inclined plane 28b, the adjacent concave portions 111b are also arranged in an irregular arrangement at a pitch between 1 μm and 30 μm. If the pitch of the adjacent concave portions 111b is less than 1 μm, the working time is extremely increased because of the restriction in making a transcription mold for use in forming the reflection inclined plane 28b, so that problems may arise that the shape to the extent obtaining desired reflection characteristics cannot be formed and light interference is produced.

According to the embodiment, on the reflection inclined plane 28b, a metallic reflection film 112a with a thickness, which will be described later, is formed. By reflecting fine corrugated shapes of the reflection inclined plane 28b on the metallic reflection film 112a, a surface of the metallic reflection film 112a becomes a irregular surface 112.

When the reflector 30 is longitudinally sectioned at a specific longitudinal section, on the irregular surface 112, which is a surface of the metallic reflection film 112a, as shown in FIG. 5, the inclination of the profile curve in the longitudinal section is discontinuous, in other words, a first derivative of the profile curve in the longitudinal section is discontinuous.

The metallic reflection film 112a may use a metal with a high reflection such as Al and Ag as a material.

It is preferable that the metallic reflection film 112a have a film thickness between 80 nm and 200 nm. If the film thickness is less than 80 nm, it is not preferable as the reflectance of the metallic reflection film 112a is too small so that the display in the reflection mode is dark, while if the film thickness is more than 200 nm, it is also not preferable as the cost of film is increased more than necessary and the corrugation of the irregular surface 112 is reduced to be nearly flat.

In the metallic reflection film 112a, the depth D of the concave portion 111b irregularly fluctuates in a range between 0.3 μm and 3 μm by the same reason as that of the first embodiment.

The pitch P of the adjacent concave portions 111b irregularly fluctuates in a range between 1 μm and 30 μm.

Next, the optical diffusion layer 29 is made of a matrix of a transparent resin or a transparent adhesive having fine particles uniformly dispersed therein so as to flatten the corrugation due to the reflection inclined plane 28b of the reflection substrate 28. The optical diffusion degree in the optical diffusion layer 29 can be controlled by changing conditions such as materials of the fine particles and the matrix and the content of the fine particles.

The optical diffusion degree in the optical diffusion layer 29 is preferable when a haze thereof is in a range between 15% and 30%.

Wherein the haze (also called as a haze value) represents the ratio of the diffuse transmission factor (unit: %) to the entire light transmission factor (unit: %) as an index of the optical diffusion degree. The haze according to the present invention is the value obtained by the measuring method compliant with JIS (Japanese Industrial Standards) K 7105.

According to the embodiment, if the haze of the optical diffusion layer 29 is less than 15%, it is difficult to sufficiently eliminate rainbows while if the haze is more than 30% to the contrary, the optical diffusion is too large so that the reflection efficiency of illuminating light is reduced, thereby remarkably deteriorating display characteristics such as display brightness and the contrast in the display screen.

The combination of the fine particles contained in the optical diffusion layer 29 with the matrix is required to be different in the respective refractive indexes, and the larger the difference, the more remarkable optical diffusion effect can be obtained.

The fine particles contained in the optical diffusion layer 29 may have a particle diameter between 1 μm and 20 μm, more preferably between 3 μm and 15 μm, and it is preferable that the particle diameter be about 20 times as long as the range of wave lengths of visible light. More specifically, the fine particles may be exemplified by those made of silica, a styrene-butadiene copolymer, divinylbenzene, a urethane resin, a silicone resin, an epoxy resin, and polyethylene.

The transparent resin constituting the matrix may be exemplified by an acrylic resin and a urethane resin; the transparent adhesive may be exemplified by an acrylic resin, a polyester resin, and copolymers and mixtures of these resins.

According to the embodiment, it is preferable to use the transparent adhesive as the matrix, and in this case, the reflector 30 can be bonded on the first substrate 21 with a transparent adhesive 31.

The optical diffusion layer 29 according to the present invention is used by combining the above-mentioned fine particles and the matrix so as to satisfy the range of the haze described above.

An additive rate of the fine particles to the matrix preferably is between 0.1 mass % and 10 mass %. If the additive rate is less than 1.0 mass %, it is not preferable because there is no supplemental effect of the fine particles, while if the additive rate is more than 10 mass %, it is not preferable because the reflection efficiency of illuminating light is reduced by the too large optical diffusion, thereby deteriorating display brightness and the contrast in the display screen.

The thickness of the optical diffusion layer 29 in portions having largest thicknesses is preferable in a range between 30 μm and 200 μm. It is neither preferable in a thickness less than 30 μm nor in a thickness more than 200 μm because of the insufficient optical diffusion effect and the too large optical diffusion, respectively.

The liquid crystal display 1 structured as described above can display images with reflection by turning on the front light 10 so as to use this light as illumination light other than the reflection display using ambient light such as sunlight and illumination as the illumination light.

In any case, as shown in FIG. 2, light Q incident in the liquid crystal cell 20 is reflected by the reflection inclined plane 28b after passing through the second substrate 22, the display circuit 26, the liquid crystal layer 23, the display circuit 27, the first substrate 21, the adhesive layer 31, and the optical diffusion layer 29 in that order. This reflected light R enters the liquid crystal cell 20 from the first substrate 21 after passing through the optical diffusion layer 29 in the order opposite to the light Q; then, it is emitted from the external side of the liquid crystal cell 20 (adjacent to the front light 10) so as to arrive at an observer after further passing through the front light 10, so that the display of the liquid crystal cell 20 is visible by the observer. According to the embodiment, in the case where strong sunlight is incident for example, even the spectrum is produced by the irregular surface 112 of the reflection inclined plane 28b when the light Q is reflected by the reflection inclined plane 28b of the reflector 30, rainbows are not visible by the observer because the reflected light R is scattered during the passing through the optical diffusion layer 29.

By setting the haze of the optical diffusion layer 29 within the above-mentioned preferable range, the rainbows can be prevented from being produced in the display while the darkened display or the deteriorated contrast produced by the reduced reflectance of the illuminating light due to the increased scattering of the reflected light can be restricted.

Since there are provided the reflection inclined planes inclining at the above-mentioned preferable angle, light Q incident from the outside, as shown in FIG. 2, can be reflected in a direction R at an angle smaller than a regular reflection angle ω relative to a normal direction H1. Thereby, the reflection direction R of the reflected light can be approximated to the visual axial direction $α_1$ of an observer, enabling the brightness of the liquid crystal display to be improved.

Furthermore, since the surface of the reflection inclined plane 28*b* is the irregular surface 112, incident light can be scattered during the reflection, enabling the reflection angle range to be increased.

On the second substrate 22 adjacent to the front light 10 of the liquid crystal cell 20, a retardation film or a polarizing plate may be provided if necessary.

If the color filter is provided in the display circuit 27 on the first substrate 21 adjacent to the reflector 30, the color display is enabled, and since the first substrate 21 lying between the color filter and the reflector 30 is particularly thin, high quality color display can be obtained with reduced color drift and parallax.

Second Embodiment

Figure 6:
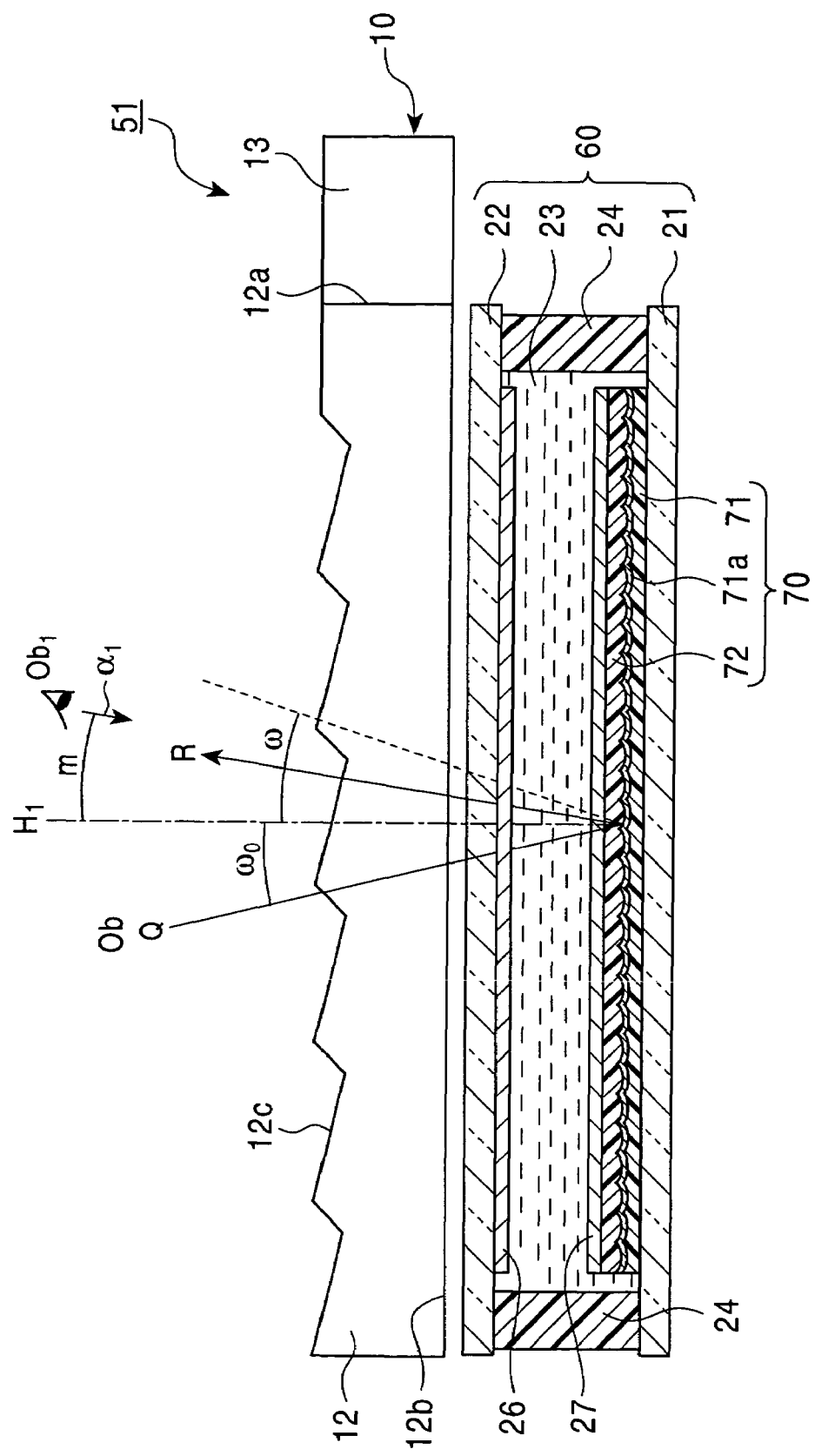
FIG. 6 is a schematic sectional view of a liquid crystal display according to a second embodiment of the present invention.

A second embodiment according to the present invention will be described below with reference to the drawings. FIG. 6 is a schematic sectional view of a liquid crystal display according to the second embodiment of the present invention. In FIG. 6, like reference characters designate like elements common to those shown in FIGS. 1 to 5, and the description thereof is omitted or simplified.

The point of the liquid crystal display according to the embodiment differing from the liquid crystal display according to the first embodiment is that a reflector is arranged inside a liquid crystal cell.

That is, as shown in FIG. 6, a liquid crystal display 51 according to the embodiment is substantially composed of a liquid crystal cell 60, the front light 10 arranged on the liquid crystal cell 60 adjacent to an observer, and a reflector 70 according to the present invention disposed inside the liquid crystal cell 60.

The liquid crystal cell 60 is substantially composed of the first substrate (one substrate) 21 and the second substrate (the other substrate) 22, which are opposing each other and sandwiching the liquid crystal layer 23 therebetween, and are integrally bonded with the sealing material 24.

There is provided the display circuit 26 arranged adjacently to the liquid crystal layer 23 (on internal surface of the liquid crystal layer 23).

The reflector 70 according to the present invention and the display circuit 27 are sequentially deposited adjacently to the liquid crystal layer 23 (on internal surface of the liquid crystal layer 23).

The display circuits 26 and 27 each include electrode layers made of transparent conductive films for driving the liquid crystal layer 23 and alignment layers for controlling orientation of the liquid crystal layer 23 in the same way as in the first embodiment. In the case of color displaying, they may include color filters.

As described above, the reflector 70 is arranged between the first substrate (the one substrate) 21 and the display circuit 27 including an electrode disposed on the external surface thereof. The reflector 70 is composed of a reflection substrate 71 having a diffuse reflection shape and an optical diffusion layer 72 deposited on the reflection substrate 71. On the surface of the reflection substrate 71, a metallic reflection film 71*a* is formed, and the optical diffusion layer 72 is deposited in contact with the metallic reflection film 71*a*.

In addition, the reflection substrate 71, the metallic reflection film 71*a*, and the optical diffusion layer 72 are the same in structure as the reflection substrate 28, the metallic reflection film 28*a*, and the optical diffusion layer 29 according to the first embodiment.

According to the liquid crystal display 51, the same effect as that of the liquid crystal display 1 according to the first embodiment can be obtained.

Furthermore, according to the liquid crystal display 51, the optical path length can be reduced by arranging the reflection substrate 71 inside the liquid crystal cell 60, resulting in achieving bright display performances by reducing optical losses.

Third Embodiment

Figure 7:
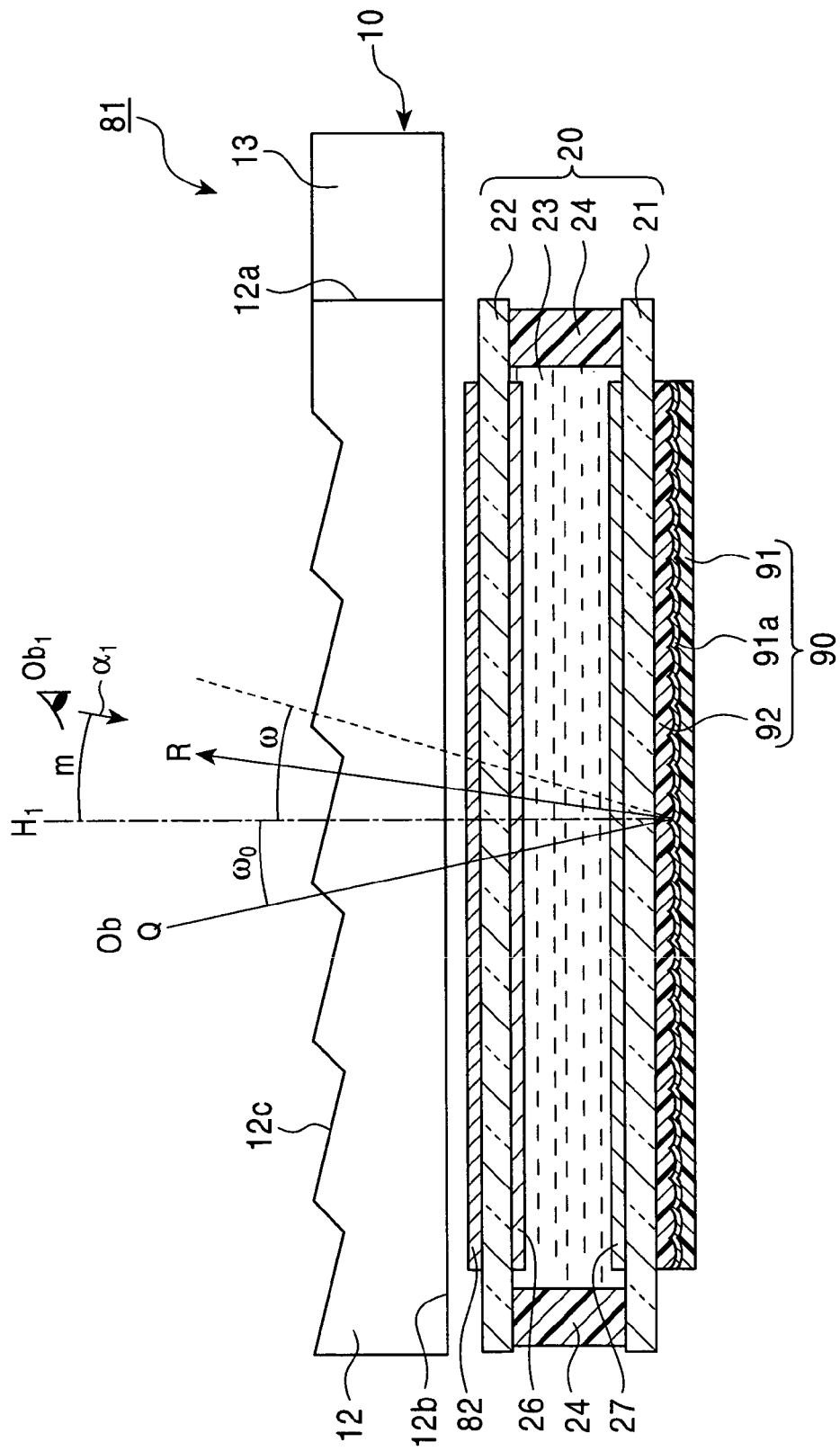
FIG. 7 is a schematic sectional view of a liquid crystal display according to a third embodiment of the present invention.

A third embodiment according to the present invention will be described below with reference to the drawings. FIG. 7 is a schematic sectional view of a liquid crystal display according to the second embodiment of the present invention. In FIG. 7, like reference characters designate like elements common to those shown in FIGS. 1 to 5, and the description thereof is omitted or simplified.

The points of the liquid crystal display according to the embodiment differing from the liquid crystal display according to the first embodiment are that an optical diffusion layer is arranged between a front light and a liquid crystal cell and a transparent flattening layer is deposited on a reflection substrate so as to flatten the reflection substrate.

That is, as shown in FIG. 7, a liquid crystal display 81 according to the embodiment is substantially composed of the liquid crystal cell 20, an optical diffusion layer 82 arranged on the liquid crystal cell 20 adjacent to an observer, the front light 10 arranged on the external surface of the optical diffusion layer 82, and a reflector 90 externally attached on the surface of the liquid crystal cell 20 opposite to the front light 10.

The liquid crystal cell 20 is substantially composed of the first substrate (the one substrate) 21 and the second substrate (the other substrate) 22, which are opposing each other and sandwiching the liquid crystal layer 23 therebetween, and are integrally bonded with the sealing material 24.

The first substrate 21 and the second substrate 22 each are made of transparent substrates such as glass substrates. There are provided display circuits 26 and 27 arranged adjacently to the liquid crystal layer 23 (on internal surfaces of the liquid crystal layer 23), respectively.

In the same way as in the first embodiment, the display circuits 26 and 27, although not shown, each include electrode layers made of transparent conductive films for driving the liquid crystal layer 23 and alignment layers for controlling orientation of the liquid crystal layer 23. In the case of color displaying, they may include color filters.

The optical diffusion layer 82 is deposited on the external surface of the second substrate 22 in the liquid crystal cell 20. This optical diffusion layer 82 is made of a matrix of a transparent resin or a transparent adhesive having fine particles uniformly dispersed therein. The specific examples of the fine particles and the matrix constituting the optical diffusion layer 82 are the same as the optical diffusion layer 29 according to the first embodiment.

The optical diffusion degree in the optical diffusion layer 82, in the same way as those in the optical diffusion layers 29 and 72 according to the first and the second embodiment, can be controlled by changing conditions such as materials of the fine particles and the matrix and the content of the fine particles. The optical diffusion degree in the optical diffusion layer 82 is preferable when a haze thereof is in a range between 15% and 30%.

According to the embodiment, if the haze of the optical diffusion layer 82 is less than 15%, it is difficult to sufficiently eliminate rainbows while if the haze is more than 30% to the contrary, the optical diffusion is too large so that the reflection efficiency of illuminating light is reduced, thereby remarkably deteriorating display characteristics such as display brightness and the contrast in the display screen.

An additive rate of the fine particles to the matrix preferably is between 1.0 mass % and 10 mass %. If the additive rate is less than 1.0 mass %, it is not preferable because there is no supplemental effect of the fine particles, while if the additive rate is more than 10 mass %, it is not preferable because the reflection efficiency of illuminating light is reduced by the too large optical diffusion, thereby deteriorating display brightness and the contrast in the display screen.

The thickness of the optical diffusion layer 82 is preferable in a range between 30 μm and 200 μm. It is neither preferable in a thickness less than 30 μm nor in a thickness more than 200 μm because of the insufficient optical diffusion effect and the too large optical diffusion, respectively.

Next, as described above, the reflector 90 is arranged on the external surface of the first substrate (the one substrate) 21. The reflector 90 is composed of a reflection substrate 91 and a transparent flattening layer 92 deposited on the reflection substrate 91. On the surface of the reflection substrate 91, a metallic reflection film 91a is formed, and the transparent flattening layer 92 is deposited in contact with the metallic reflection film 91a.

The reflection substrate 91 and the metallic reflection film 91a are the same in structure as the reflection substrate 28 and the metallic reflection film 28a according to the first embodiment.

The transparent flattening layer 92 is made of a transparent resin such as an acrylic resin and a urethane resin and it covers the reflection substrate 91 so as to flatten it while bonding the reflection substrate 91 on the first substrate 21.

The liquid crystal display 81 structured as described above can display images with reflection by turning on the front light 10 so as to use this light as illumination light other than the reflection display using ambient light such as sunlight and illumination as the illumination light.

In any case, as shown in FIG. 7, light Q incident in the liquid crystal cell 20 is reflected by the reflection substrate 91 after passing through the optical diffusion layer 82, the second substrate 22, the display circuit 26, the liquid crystal layer 23, the display circuit 27, and the first substrate 21 in that order. This reflected light R enters the liquid crystal cell 20 from the first substrate 21 in the order opposite to the light Q; then, it is emitted from the external side of the liquid crystal cell 20 (adjacent to the front light 10) so as to arrive at an observer after further passing through the optical diffusion layer 82 and the front light 10, so that the display of the liquid crystal cell 20 is visible by the observer. According to the embodiment, in the case where strong sunlight is incident for example, even the spectrum is produced by the irregular surface of the reflection inclined plane when the light Q is reflected by the reflector 90, rainbows are not visible by the observer because the reflected light R is scattered during the passing through the optical diffusion layer 82.

According to the embodiment in particular, since the reflector 90 is separated from the optical diffusion layer 82, and moreover, the reflector 90, which is a point of releasing the scattering, is separated from the optical diffusion layer 82 with the liquid crystal cell 20 therebetween, the optical diffusion effect of the optical diffusion layer 82 can be improved by increasing the space between the reflector 90 and the optical diffusion layer 82.

Furthermore, in the liquid crystal display 81 according to the embodiment, other than the above-mentioned effect, the same advantages as in the first and the second embodiment can be obtained.

The technical scope of the present invention is not limited to the embodiments described above and various modifications can be made within the spirit of the present invention.

According to the first to third embodiments described above, the surface of the reflection substrate is corrugated for corrugating the reflection inclined planes; however, the present invention is not limited to this, and a particle layer having a number of optical reflective fine particles with different particle diameters dispersed and bonded therein may be formed on the reflection inclined planes so as to form the irregular surface therewith.

The optical reflective fine particles may use an appropriately selected material such as alumina particles, organic beads such as a divinylbenzene polymer, and spherical beads. The radius of an optical reflective fine particle 12b used may be in a range between 0.5 μm and 15 μm.

Figure 8:
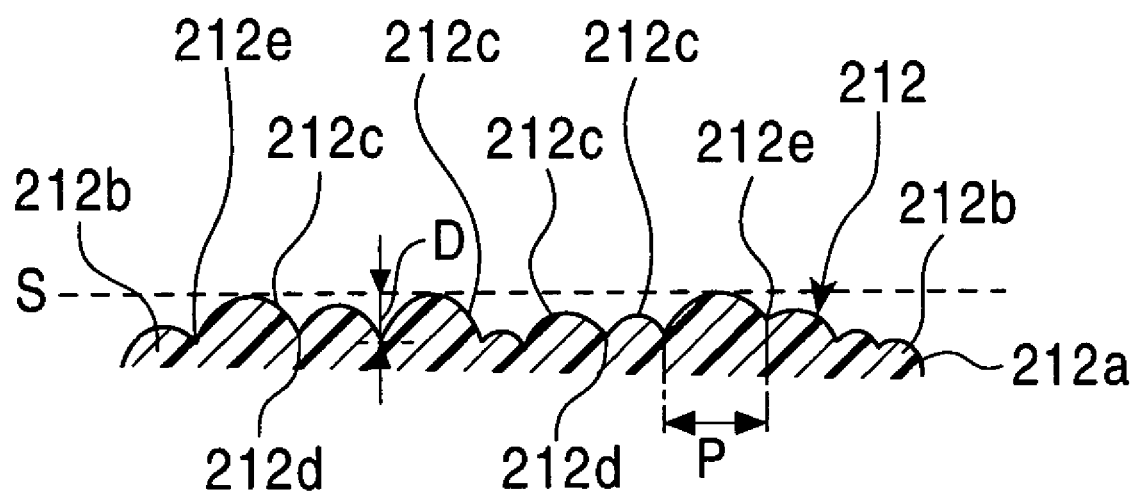
FIG. 8 is an enlarged sectional view showing another example of the sectional curve of the reflection inclined-plane section of the reflector.
Figure 9:
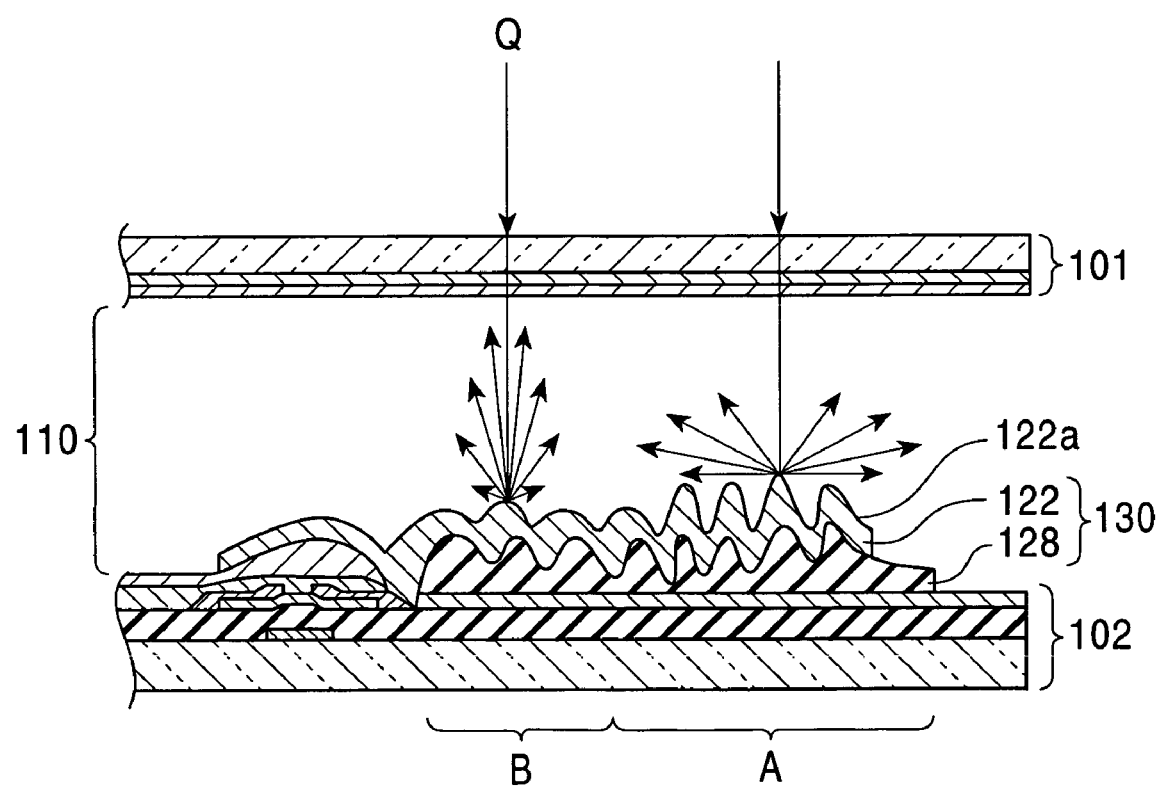
FIG. 9 is a side sectional view of an example of a conventional reflection liquid crystal display.
Figure 10:
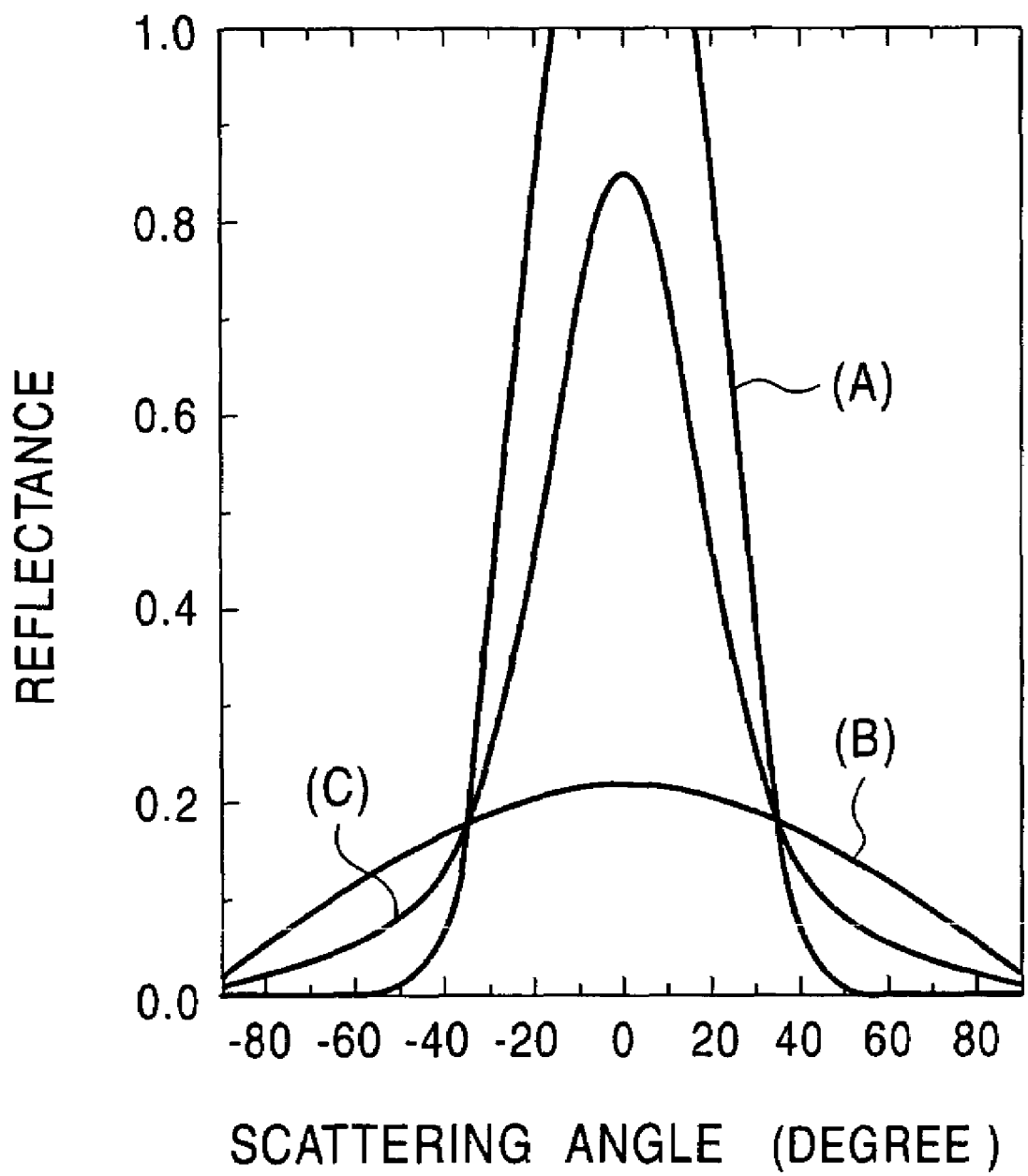
FIG. 10 is a drawing showing reflection characteristics of a reflection plate arranged in the conventional reflection liquid crystal display.
Figure 11:
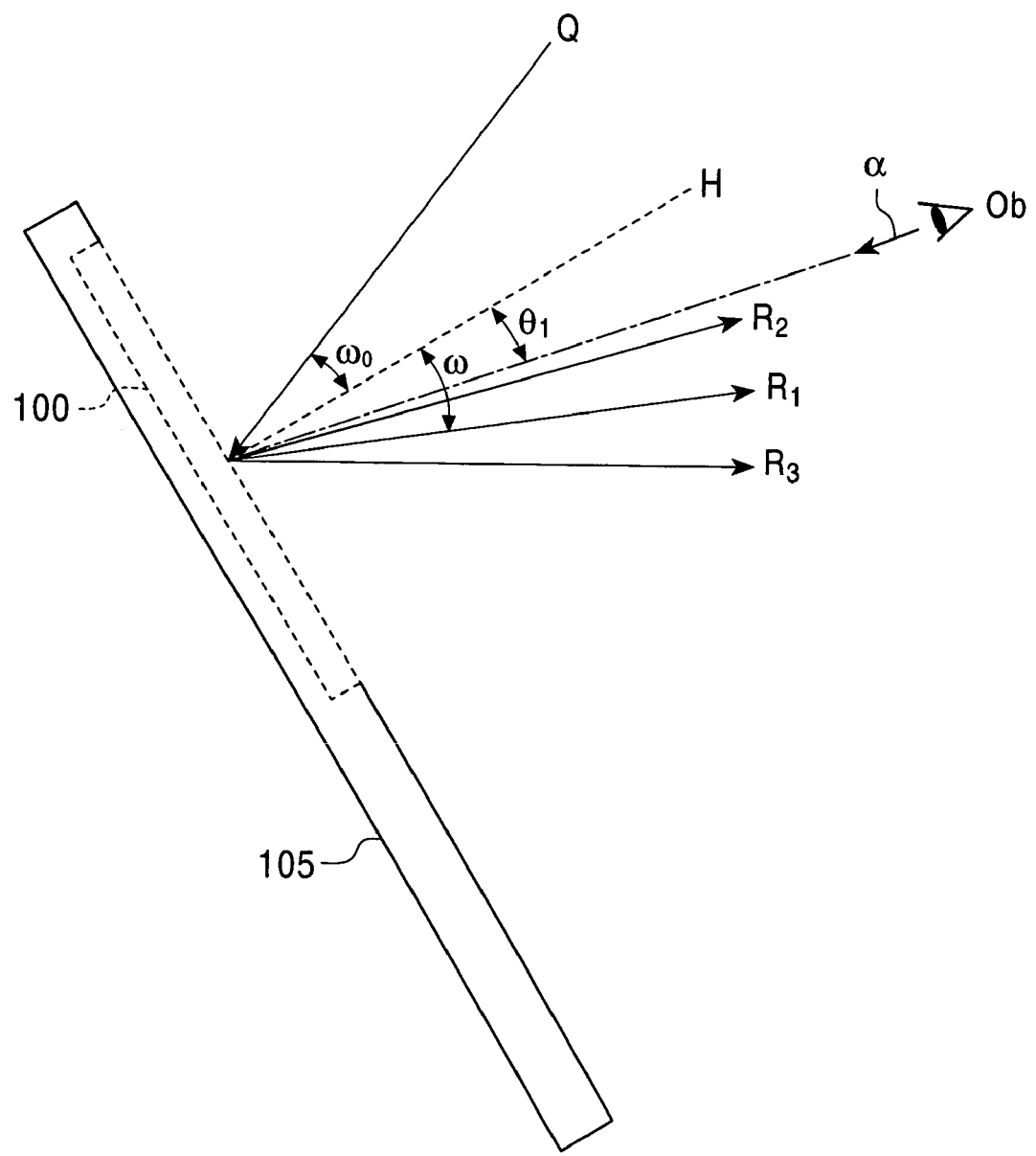
FIG. 11 is an explanatory view showing service conditions of a liquid crystal display provided in a mobile phone.

In this case, when the reflection inclined plane is longitudinally sectioned at a particular section, on the surface (a irregular surface 212), as shown in FIG. 8, inclination of a sectional curve of the longitudinal section is discontinuous, in other words, a first deviation curve of the sectional curve of the longitudinal section is discontinuous.

This irregular surface 212 is made of a particle layer 212a composed of a number of optical reflective fine particles 212b with a radius in the above-mentioned range, so that the depths D of concave portions 212e irregularly vary within a range between 0.3 μm and 3 μm. Wherein the depth D of the concave portions 212e, as shown in FIG. 8, represents a distance from a reference surface S of the particle layer 212a including the apex located at the longest distance from the surface of the reflection substrate among apexes of convex portions 212c. If the depth D of the concave portions 212e is more than 3 μm, when the optical diffusion layer or the transparent flattening layer is formed on the particle layer 212a so as to flatten the particle layer 212a, apexes of the convex portions 212c cannot be sufficiently buried with such a layer and the desired flatness is not obtained, causing display unevenness.

According to the reflector structured as described above, when reflected light incident in the reflector is observed at a particular visual angle, reflection characteristics can be easily controlled so that the visibility is more bright than that at other visual angles.

The above-mentioned reflector can be manufactured by preparing the reflection substrate having the reflection inclined planes formed thereon and by dispersing and bonding a number of optical reflective fine particles with random particle diameters on each reflection inclined plane so as to form the particle layer 212a having a number of fine corrugated portions randomly arranged on the surface.

According to the first to third embodiments, discontinuous inclination of a sectional curve of the longitudinal section is exemplified in the irregular surface of the reflector; however, the present invention is not limited to this, and continuous inclination may be applied to the sectional curve of the irregular surface, in other words, a first deviation curve of the sectional curve of the irregular surface may vary continuously. However, since in the continuous inclination of the sectional curve, the half-band width of the Gaussian curve is smaller than that of the discontinuous inclination, the discontinuous inclination of the sectional curve may be preferably adopted for obtaining the large reflectance with a large angular range.

What is claimed is:

1. A reflector comprising:
   a reflection substrate; and
   an optical diffusion layer deposited on the reflection substrate so as to flatten the surface thereof,
   wherein the reflection substrate is provided with a plurality of reflection inclined planes continuously formed on a surface thereof with a stripe geometry in plan view and a surface of each refection inclined plane is provided with concave portions having a depth within a range of 0.3 μm to 3 μm irregularly, adjacent concave portions arranged irregularly at a pitch between 1 μm and 30 μm, and
   wherein the optical diffusion layer is a transparent resin or a transparent adhesive having fine particles dispersed therein, and a thickness of a thickest portion of the optical diffusion layer is in the range of between 30 μm and 200 μm.

2. A reflector according to claim 1, wherein a haze of the optical diffusion layer is between 15% and 30%.

3. A reflector according to claim 1, wherein an inclined angle θ of the refection inclined plane with respect to a surface of the reflection substrate is between 0° and 30°.

4. A reflector according to claim 1, wherein a haze of the optical diffusion layer is at feast 15% and less than 20%.

5. A reflector according to claim 1, wherein the fine particles have a particle diameter between 1 μm and 20 μm.

6. A reflector according to claim 1, wherein the fine particles have a particle diameter between 3 μm and 15 μm.

7. A reflector according to claim 1, wherein the fine particles comprise silica, a styrene-butadiene copolymer, divinylbenzene, a urethane resin, a silicone resin, an epoxy resin, or polyethylene.

8. A reflector according to claim 1, wherein the fine particles comprise between 0.1 mass % and 10 mass % of the optical diffusion layer.

9. The reflector of claim 1, wherein an inclination angle of the reflection inclined planes is about one-half of an angle between a normal of a display surface and a main viewing direction of an observer.

10. The reflector of claim 1, wherein a pitch of the reflection inclined planes is in the range between 5 μm and 80 μm.

11. A liquid crystal display comprising:
    a liquid crystal cell which comprises substrates opposing each other and a liquid crystal layer sandwiched by the substrates therebetween, one substrate having an electrode and an alignment layer formed on an internal surface in that order from the one substrate while the other substrate having an electrode and an alignment layer formed on an internal surface in that order from the other substrate;
    a front light arranged adjacently to an external surface of the other substrate;
    a reflection substrate arranged adjacently to an external surface of the one substrate or between the one substrate and the electrode disposed on the one substrate; and
    an optical diffusion layer arranged between the front light and the reflection substrate1 serving to flatten the reflection substrate,
    wherein the reflection substrate is provided with a plurality of reflection inclined planes continuously formed on a surface thereof with a stripe geometry in plan view and a surface of each refection inclined plane is provided with concave portions having a depth within a range of 0.3 μm to 3 μm irregularly, adjacent concave portions arranged irregularly at a pitch between 1 μm and 30 μm, and
    wherein the optical diffusion layer is made of a transparent resin or a transparent adhesive having fine particles dispersed therein, wherein a thickness of a thickest portion of the optical diffusion layer is in the range of between 30 μm and 200 μm.

12. A display according to claim 11, wherein the optical diffusion layer is arranged between one substrate and the front light.

13. A display according to claim 11, wherein the optical diffusion layer is deposited on the reflection substrate, which is arranged between the one substrate and the electrode formed on the internal surface of the one substrate.

14. A display according to claim 11, wherein the optical diffusion layer is deposited on the reflection substrate, which is arranged adjacently to the external surface of the one substrate.

15. A display according to claim 11, wherein a haze of the optical diffusion layer is between 15% and 30%.

16. A display according to claim 11, wherein an inclined angle θ of the refection inclined plane with respect to a surface of the reflection substrate is between 0° and 30°.

17. A display according to claim 11, wherein a haze of the optical diffusion layer is at least 15% and less than 20%.

18. A display according to claim 11, wherein the fine particles have a particle diameter between 1 μm and 20 μm.

19. A display according to claim 11, wherein the fine particles have a particle diameter between 3 μm and 15 μm.

20. A display according to claim 11, wherein the fine particles comprise silica, a styrene-butadiene copolymer, divinylbenzene, a urethane resin, a silicone resin, an epoxy resin, or polyethylene.

21. A display according to claim 11, wherein the fine particles comprise is between 0.1 mass % and 10 mass % of the optical diffusion layer.

22. The liquid crystal display of claim 11, wherein an inclination angle of the reflection inclined planes is about one-half of an angle between a normal of a display surface and a main viewing direction of an observer.

23. The liquid crystal display of claim 11, wherein a pitch of the reflection inclined planes is in the range between 5 μm and 80 μm.

24. The liquid crystal display of claim 11, wherein the electrodes on the substrates are arranged at a pitch that is equal to a pitch of the reflection inclined planes.

25. A reflector comprising:
    a reflection substrate; and
    an optical diffusion layer deposited so as to flatten the reflection substrate,
    wherein the reflection substrate is provided with a plurality of reflection inclined planes continuously formed on a surface thereof with a stripe geometry in plan view and a surface of each refection inclined plane is an irregular surface, and
    wherein the optical diffusion layer is made of a matrix of a transparent resin or a transparent adhesive, the optical diffusion layer having fine particles with a particle diameter between 1 μm and 20 μm dispersed therein, the fine particles comprise—between 0.1 mass % and 10 mass % of the optical diffusion layer, and a thickness of a thickest portion of the optical diffusion layer is in the range of between 30 μm and 200 μm.

26. The reflector of claim 25, wherein an inclination angle of the reflection inclined planes is about one-half of an angle between a normal of a display surface and a main viewing direction of an observer.

27. The reflector of claim 25, wherein a pitch of the reflection inclined planes is in the range between 5 μm and 80 μm.

28. A reflector comprising:
a reflection substrate; and
an optical diffusion layer deposited on the reflection substrate so as to flatten the surface thereof,
wherein the reflection substrate is provided with a plurality of reflection inclined planes continuously formed on a surface thereof with a stripe geometry in plan view, and a pitch of the reflection inclined planes is in the range between 5 μm and 80 μm, and
wherein the optical diffusion layer is a transparent resin or a transparent adhesive having fine particles dispersed therein, and a thickness of a thickest portion of the optical diffusion layer is in the range of between 30 μm and 200 μm.

29. The reflector of claim 28, wherein a surface of each reflection inclined plane is provided with concave portions.

30. The reflector of claim 29, wherein a surface of each refection inclined plane is provided with concave portions having a depth within a range of 0.3 μm to 3 μm irregularly, adjacent concave portions arranged irregularly at a pitch between 1 μm and 30 μm.

31. A reflector comprising:
a reflection substrate; and
an optical diffusion layer deposited on the reflection substrate so as to flatten the surface thereof,
wherein the reflection substrate is provided with a plurality of reflection inclined planes continuously formed on a surface thereof with a stripe geometry in plan view, and
wherein the optical diffusion layer is a transparent resin or a transparent adhesive having fine particles dispersed therein, and a pitch of the reflection inclined planes is in the range between 5 μm and 80 μm.

32. The reflector of claim 31, wherein a surface of each reflection inclined plane is provided with concave portions.

33. The reflector of claim 32, wherein a surface of each refection inclined plane is provided with concave portions having a depth within a range of 0.3 μm to 3 μm irregularly, adjacent concave portions arranged irregularly at a pitch between 1 μm and 30 μm.

34. A liquid crystal display comprising:
a liquid crystal cell which comprises substrates opposing each other and a liquid crystal layer sandwiched by the substrates therebetween, one substrate having an electrode and an alignment layer formed on an internal surface in that order from the one substrate while the other substrate having an electrode and an alignment layer formed on an internal surface in that order from the other substrate;
a front light arranged adjacently to an external surface of the other substrate;
a reflection substrate arranged adjacently to an external surface of the one substrate or between the one substrate and the electrode disposed on the one substrate; and
an optical diffusion layer arranged between the front light and the reflection substrate, serving to flatten the reflection substrate,
wherein the reflection substrate is provided with a plurality of reflection inclined planes continuously formed on a surface thereof with a stripe geometry in plan view, and
wherein the optical diffusion layer is made of a transparent resin or a transparent adhesive having fine particles dispersed therein, and a thickness of a thickest portion of the optical diffusion layer is in the range of between 30 μm and 200 μm.

35. The liquid crystal display of claim 34, wherein a surface of each reflection inclined plane is provided with concave portions.

36. The liquid crystal display of claim 35, wherein the concave portions have a depth within a range of 0.3 μm to 3 μm irregularly, adjacent concave portions arranged irregularly at a pitch between 1 μm and 30 μm.

37. A liquid crystal display comprising:
a liquid crystal cell which comprises substrates opposing each other and a liquid crystal layer sandwiched by the substrates therebetween, one substrate having an electrode and an alignment layer formed on an internal surface in that order from the one substrate while the other substrate having an electrode and an alignment layer formed on an internal surface in that order from the other substrate;
a front light arranged adjacently to an external surface of the other substrate;
a reflection substrate arranged adjacently to an external surface of the one substrate or between the one substrate and the electrode disposed on the one substrate; and
an optical diffusion layer arranged between the front light and the reflection substrate, serving to flatten the reflection substrate,
wherein the reflection substrate is provided with a plurality of reflection inclined planes continuously formed on a surface thereof with a stripe geometry in plan view, and a pitch of the reflection inclined planes is in the range between 5 μm and 80 μm, and
wherein the optical diffusion layer is made of a transparent resin or a transparent adhesive having fine particles dispersed therein.

38. The liquid crystal display of claim 37, wherein a surface of each reflection inclined plane is provided with concave portions.

39. The liquid crystal display of claim 38, wherein the concave portions have a depth within a range of 0.3 μm to 3 μm irregularly, adjacent concave portions arranged irregularly at a pitch between 1 μm and 30 μm.

40. A liquid crystal display comprising:
a liquid crystal cell which comprises substrates opposing each other and a liquid crystal layer sandwiched by the substrates therebetween, one substrate having an electrode and an alignment layer formed on an internal surface in that order from the one substrate while the other substrate having an electrode and an alignment layer formed on an internal surface in that order from the other substrate;
a front light arranged adjacently to an external surface of the other substrate;
a reflection substrate arranged adjacently to an external surface of the one substrate or between the one substrate and the electrode disposed on the one substrate; and
an optical diffusion layer arranged between the front light and the reflection substrate, serving to flatten the reflection substrate, wherein the reflection substrate is provided with a plurality of reflection inclined planes continuously formed on a surface thereof with a stripe geometry in plan view, and wherein the optical diffusion layer is made of a transparent resin or a transparent adhesive having fine particles dispersed therein, and wherein the electrodes on the substrates are arranged at a pitch that is equal to a pitch of the reflection inclined planes.

41. The liquid crystal display of claim 40, wherein a surface of each reflection inclined plane is provided with concave portions.

42. The liquid crystal display of claim 41, wherein the concave portions have a depth within a range of 0.3 µm to 3 µm irregularly, adjacent concave portions arranged irregularly at a pitch between 1 µm and 30 µm.

43. A reflector comprising:

a reflection substrate; and an optical diffusion layer deposited so as to flatten the reflection substrate, wherein the reflection substrate is provided with a plurality of reflection inclined planes continuously formed on a surface thereof with a stripe geometry in plan view, and wherein the optical diffusion layer is made of a matrix of a transparent resin or a transparent adhesive, the optical diffusion layer having fine particles with a particle diameter between 1 µm and 20 µm dispersed therein, and the fine particles comprise—between 0.1 mass % and 10 mass % of the optical diffusion layer, and a thickness of a thickest portion of the optical diffusion layer is in the range of between 30 µm and 200 µm.

44. The reflector of claim 43, wherein a surface of each reflection inclined plane is an irregular surface.

45. A reflector comprising:

a reflection substrate; and an optical diffusion layer deposited so as to flatten the reflection substrate, wherein the reflection substrate is provided with a plurality of reflection inclined planes continuously formed on a surface thereof with a stripe geometry in plan view, and wherein the optical diffusion layer is made of a matrix of a transparent resin or a transparent adhesive, the optical diffusion layer having fine particles with a particle diameter between 1 µm and 20 µm dispersed therein, the fine particles comprise—between 0.1 mass % and 10 mass % of the optical diffusion layer; and, a pitch of the reflection inclined planes is in the range between 5 µm and 80 µm.

46. The reflector of claim 45, wherein a surface of each reflection inclined plane is an irregular surface.

* * * * *